United States Patent
Lee

(10) Patent No.: US 10,097,963 B2
(45) Date of Patent: Oct. 9, 2018

(54) APPARATUS AND METHOD FOR PROVIDING GEO-FENCING SERVICE VIA IN-VEHICLE ELECTRIC DEVICE

(71) Applicants: HYUNDAI MOTOR COMPANY, Seoul (KR); KIA MOTORS CORPORATION, Seoul (KR)

(72) Inventor: Jin Woo Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/655,735

(22) Filed: Jul. 20, 2017

(65) Prior Publication Data

US 2018/0124573 A1  May 3, 2018

(30) Foreign Application Priority Data

Nov. 2, 2016 (KR) .......................... 10-2016-0145121

(51) Int. Cl.
*H04W 4/021* (2018.01)
*H04W 4/04* (2009.01)

(52) U.S. Cl.
CPC .......... *H04W 4/046* (2013.01); *H04W 4/021* (2013.01)

(58) Field of Classification Search
CPC ......... H04W 4/04; H04W 4/02; H04W 4/029; H04W 4/14; H04W 4/48; H04W 4/70; H04W 4/021; H04W 4/185; H04W 4/023; H04W 92/18; H04W 4/046; H04W 68/00; H04W 4/30; H04W 4/025; H04W 4/043; H04W 4/50; H04W 4/80; H04W 4/60; B60R 2325/20; B60R 2325/202; B60R 2325/205; B60R 2325/10; B60R 2325/101
See application file for complete search history.

(56) References Cited

U.S. PATENT DOCUMENTS

| | | | | |
|---|---|---|---|---|
| 2003/0224805 A1* | 12/2003 | Suenaga | ............... | H04W 48/08 455/456.1 |
| 2015/0054647 A1* | 2/2015 | Edwards | ............... | G08B 21/22 340/568.1 |

(Continued)

FOREIGN PATENT DOCUMENTS

| | | |
|---|---|---|
| JP | 2003-348659 A | 12/2003 |
| KR | 20-2010-0003665 U | 4/2010 |

OTHER PUBLICATIONS

Office Action dated Jul. 14, 2017 of corresponding Korean Patent Application No. 10-2016-0145121—6 pages.

*Primary Examiner* — Meless Zewdu
(74) *Attorney, Agent, or Firm* — Knobbe Martens Olson & Bear LLP

(57) ABSTRACT

A method for controlling an in-vehicle apparatus to provide a geo-fencing service is disclosed. The method includes providing a geo-fencing service based on location of a vehicle, detecting at least one of a mobile device and a wearable device through a communication terminal equipped in the vehicle, recognizing location of the at least one of the mobile device and the wearable device, and requesting that a network server activates a notification for the geo-fencing service when the mobile device is determined to be located in a geo-fencing area and the wearable device is determined to be out of the geo-fencing area.

20 Claims, 6 Drawing Sheets

(56) References Cited

U.S. PATENT DOCUMENTS

| | | | |
|---|---|---|---|
| 2015/0382160 A1* | 12/2015 | Slay, Jr. | H04W 4/12 |
| | | | 455/466 |
| 2016/0134997 A1* | 5/2016 | Guo | H04W 4/008 |
| | | | 455/41.2 |
| 2016/0314680 A1* | 10/2016 | Crepeau | G08B 21/0205 |
| 2016/0337814 A1* | 11/2016 | Van Wiemeersch | |
| | | | H04W 4/046 |
| 2017/0048385 A1* | 2/2017 | Kashimba | H04M 3/42263 |
| 2017/0291539 A1* | 10/2017 | Avery | B60N 2/002 |
| 2018/0033277 A1* | 2/2018 | Entis | B60Q 9/00 |

* cited by examiner

APPARATUS AND METHOD FOR PROVIDING GEO-FENCING SERVICE VIA IN-VEHICLE ELECTRIC DEVICE

CROSS-REFERENCE TO RELATED APPLICATION

This application claims priority to and the benefit of Korean Patent Application No. 10-2016-0145121, filed on Nov. 2, 2016 in the Korean Intellectual Property Office, the disclosure of which is hereby incorporated by reference as if fully set forth herein.

FIELD

The disclosure relates to an in-vehicle electronic device and its controlling method for providing a geo-fencing service, and more particularly to an in-vehicle electronic device capable of recognizing the location of a user or a driver and a portable or mobile device so as to provide an effective geo-fencing service and a method of controlling the operation of the in-vehicle electronic device.

BACKGROUND

The term "Geo-Fencing" is a compound word of the terms "Geographic" and "Fencing." A geo-fencing technique could be implemented based on a wireless communication technology showing whether a user accesses to (i.e., enter into or come out of) specific area(s). The geo-fencing technique could use a Global Positioning System (GPS), which is a sort of location tracking technologies. A user designating a virtual fence so called a Geo-Fence based on the Global Positioning System (GPS) may be notified when she or he enter or leave a specific area, i.e., the geo-fence. Herein, the geo-fence may refer to a specific area designated by the user, that is, a virtual fence. It could be sensed or detected that the user possessing a portable or mobile device goes to or from the designated area.

This Geo-Fencing technique might be applicable to a connectivity service, an in-vehicle head unit, a cloud service and other services, which could be provided to a user or a driver via vehicle(s). The Geo-Fencing technique might be applied to a GPS or navigation systems equipped in the vehicle to provide a more efficient location tracking service to the driver or the user. Another example where Geo-Fencing technology is applied is a smart car-smart home service model provided by Benz-Nest. The smart car-smart home service model can use a geo-fencing technique to provide services such as turning on a house light of home or running a heater equipped in home when an automotive gets close to home.

With the Geo-Fencing technique, a service that a vehicle can provide to people can vary widely. However, in order for the geo-fencing service to be more effectively provided to the driver or the user, the vehicle is required to recognize not only the location of the user or the driver but also the location of portable or mobile device(s) used by the user or the driver.

The disclosure of this section is to provide background of the invention. Applicant notes that this section may contain information available before this application. However, by providing this section, Applicant does not admit that any information contained in this section constitutes prior art.

SUMMARY

The disclosure can use a wireless communication device or a multimedia system, equipped in a vehicle, to provide a geo-fencing service which has been provided through a portable or mobile device of a user or a driver. Also, the disclosure can provide an apparatus and a method for switching an agent for the geo-fencing service between the wireless communication or the multimedia system and the portable or mobile device, depending upon whether the user or the driver rides in the vehicle.

In addition, when a user or a driver left her or his portable or mobile device in a vehicle, the disclosure can provide a method and an apparatus used in the vehicle providing a notification to another portable or mobile device designated by the user or the driver through an in-vehicle wireless communication terminal.

Further, the disclosure is also applicable to a wireless communication device or a multimedia system mounted on a vehicle that can be engaged with a portable or mobile device of a user or a driver, which may be equipped with an apparatus, or controlled by a method, for recognizing location of the user or the driver through a wearable device worn by the user or the driver and providing a geo-fencing service based on a recognized location.

A method for method for controlling an in-vehicle apparatus providing a geo-fencing service can include providing a geo-fencing service based on location of a vehicle; detecting at least one of a mobile device and a wearable device through a communication terminal equipped in the vehicle; recognizing location of the at least one of the mobile device and the wearable device; and requesting that a network server activates a notification for the geo-fencing service when the mobile device is determined to be located in a geo-fencing area and the wearable device is determined to be out of the geo-fencing area.

The detecting the mobile device and the wearable device can include detecting the mobile device coupled with the communication terminal through at least one of a short-range wireless communication technology and a wired communication technology; and receiving, from the mobile device, information of the wearable device engaged with the mobile device through the short-range wireless communication technology.

The detecting the mobile device and the wearable device can include detecting the mobile device coupled with the communication terminal through at least one of a short-range wireless communication technology and a wired communication technology; and detecting the wearable device coupled with the communication terminal through the short-range wireless communication technology.

The geo-fencing service can be performed based on information received from the network server by the communication terminal. Further, the communication terminal can be engaged with at least one of the mobile device and the wearable device through a short-range wireless communication technology including at least one of Bluetooth, Bluetooth Low Energy, Zigbee, Ultra Wide Band (UWB), and millimeter wave (mmWave).

The method can further include requesting that the network server deactivates the notification for the geo-fencing service when the mobile device and the wearable device are determined to be located within the geo-fencing area.

The method can further include requesting that the network server activates the notification for the geo-fencing service when the mobile device is not detected.

The requesting that the network server activates the notification for the geo-fencing service can include at least one of: requesting activation of the notification at the network server coupled with the communication terminal via a wireless communication network; and requesting that the network server transmits a message to a predetermined mobile device pre-established at the network server.

The predetermined mobile device can include at least one portable device preset by a user possessing the mobile device.

An in-vehicle control apparatus 50 for controlling or providing a geo-fencing service could include at least one of a computing device or a processing system that comprises at least one data processor and at least one computer-readable memory storing a computer program. Herein, the processing system can be configured to cause the in-vehicle control apparatus to: provide a geo-fencing service can include providing a geo-fencing service based on location of a vehicle; detect at least one of a mobile device and a wearable device through a communication terminal equipped in the vehicle; recognize location of the at least one of the mobile device and the wearable device; and request that a network server activates a notification for the geo-fencing service when the mobile device is determined to be located in a geo-fencing area and the wearable device is determined to be out of the geo-fencing area.

An in-vehicle apparatus for controlling a geo-fencing service can include a service delivery unit configured to deliver a geo-fencing service provided based on location of a vehicle; a communication unit configured to detect at least one of a mobile device and a wearable device and to recognize location of the at least one of the mobile device and the wearable device; and a controller configured to request a network server activates a notification for the geo-fencing service when the mobile device is determined to be located in a geo-fencing area and the wearable device is determined to be out of the geo-fencing area.

The geo-fencing service can be performed based on information received from the network server by the communication unit.

The communication unit can be capable of detecting the mobile device coupled through at least one of a short-range wireless communication technology and a wired communication technology and receiving information of the wearable apparatus, engaged with the mobile device via the short-range wireless communication technology, from the mobile device.

The communication unit may be capable of detecting the mobile device coupled through at least one of a wireless communication technology and a wired communication technology and receiving information of the wearable apparatus coupled via a short-range wireless communication technology.

The controller can request that the network server deactivates the notification for the geo-fencing service when the mobile device and the wearable device are determined to be located within the geo-fencing area.

The controller can request that the network server activates the notification for the geo-fencing service when the mobile device is not detected.

The controller may request activation of the notification at the network server coupled with the communication terminal via a wireless communication network, and request that the network server transmits a message to a predetermined mobile device pre-established at the network server.

A network server engaged with a vehicle to provide a geo-fencing service can include a service unit configured to recognize location of a vehicle and to provide a geo-fencing service based on the location of the vehicle; a communication unit configured to receive location of at least one of a mobile device and a wearable device from the vehicle; and a control unit configured to activate a notification for the geo-fencing service when the mobile device is determined to be is located in a geo-fencing area and the wearable device is determined to be out of the geo-fencing area.

The control unit can be configured to deactivate the notification for the geo-fencing service when the mobile device and the wearable device are determined to be located within the geo-fencing area.

The control unit can be configured to activate the notification for the geo-fencing service when the mobile device is not detected.

The control unit can be configured to transmit a message to a predetermined mobile device pre-established at the network server. Further, the message can include the location of the mobile device.

The predetermined mobile device can include at least one portable device preset by a user possessing the mobile device.

Advantages, objects, and features of the invention will be set forth in part in the description which follows and in part will become apparent to those having ordinary skill in the art upon examination of the following or may be learned from practice of the invention. Certain advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of features of the invention and are incorporated in and constitute a part of this application, illustrate embodiment(s) of the invention and together with the description serve to explain features of of the invention. In the drawings.

DETAILED DESCRIPTION

Figure 1:
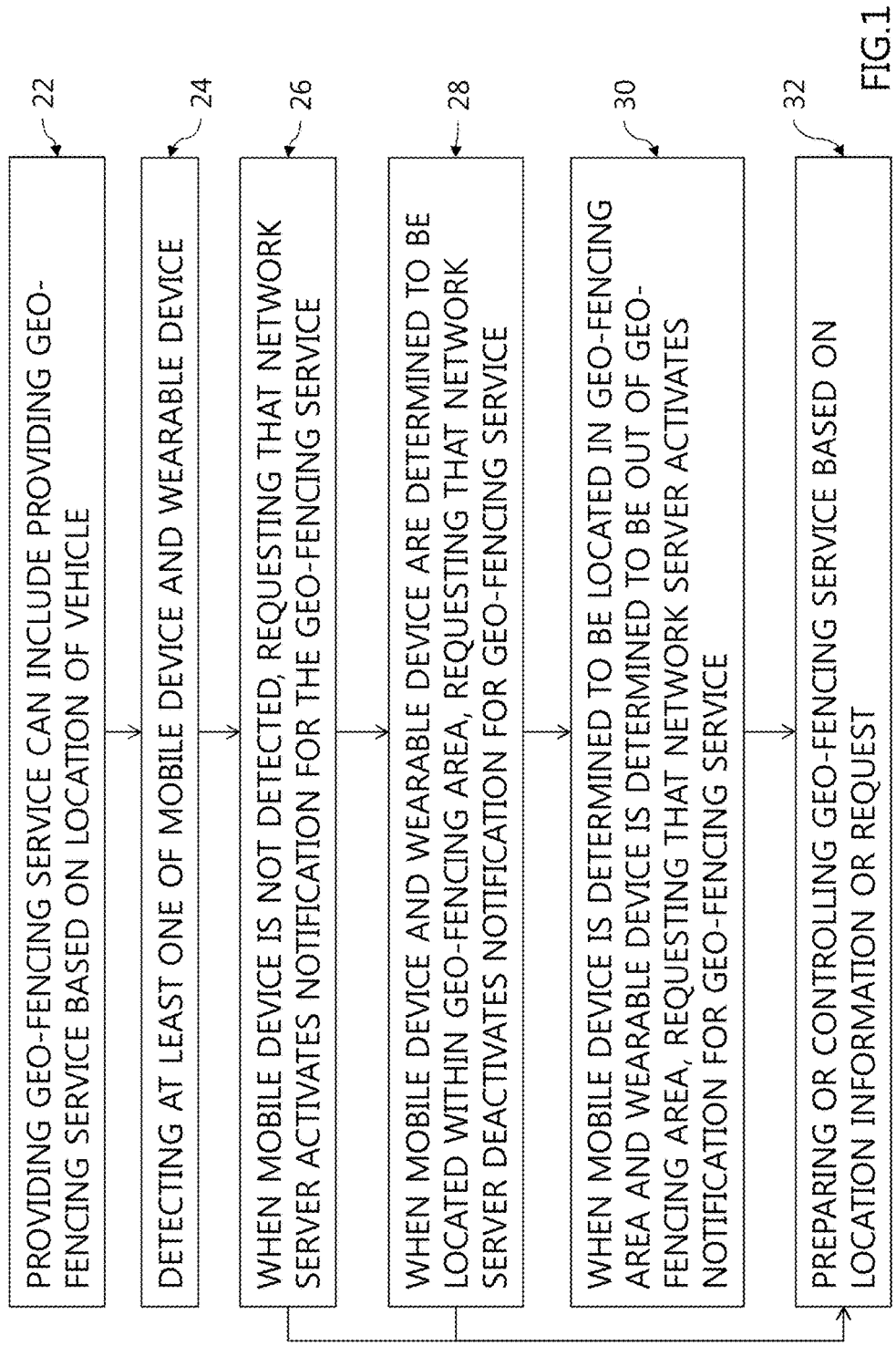
FIG. 1 shows a method for controlling an in-vehicle apparatus providing a geo-fencing service.

Reference will now be made in detail to the preferred embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of embodiments of the invention, certain detailed explanations of related art are omitted when it is deemed that they may unnecessarily obscure the essence of the invention. Features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

According to an aspect of the present invention, a computing system (Audio-Video-Navigation system, AVN) of a vehicle provides alarm or message to a driver (pre-registered user) of the vehicle.

The computing system has (has access to) a database in which a user of the vehicle, a wearable device of the user, a smartphone of the user is registered. The computing system includes a wireless device that can communicate or detect the wearable device and the smartphone. Using signals from (or communication with) the wearable device and the smartphone, the computing system determines whether at least one of the wearable device and the smartphone (1) is within a predetermined range of the vehicle, (2) is inside or outside the vehicle, (3) approaches the vehicle or moves away from the vehicle. Based on such determination, the computing system can generate different alarms to the driver for different situations.

In embodiments, (1) after the computing system detected both of the wearable device and the smart phones inside the vehicle (within a predetermined short range), when the computing system determines that (2) the wearable device is moving outside (moves away) the vehicle (for a predetermined reference time) and (3) the smartphone is not moving inside of the vehicle (for a predetermined reference time), the computing system determines that the driver has left the vehicle without the smartphone. Then, the computing system communicates with the wearable device or another computing system to provide alarm of a left smartphone to the driver. In embodiments, the computing system provides an alarm to a secondary contact different from telephone number of the smartphone, while not generating an alarm using a display or speaker (of AVN system) of the vehicle.

In embodiments, when the AVN system (1) detects signals from the wearable device inside the vehicle or within a predetermined range, but (2) detects no signals from the smartphone, outside a predetermined range from the vehicle, the AVN system generates an alarm about the missing smartphone using a display or a speaker connected of the AVN system while not reaching out another communication system outside the vehicle.

As a service that a vehicle can provide through a Geo-Fencing technology, the vehicle can selectively inform a user or a driver of whether her or his portable or mobile device has been left in the vehicle. The vehicle stores information about a geo-fencing area preset by the user or the drier. Whenever the user or the driver having the portable or mobile device gets in or goes out the geo-fencing area stored in the vehicle, the vehicle can recognize whether the user or the driver enters and exits the geo-fencing area.

Setting or storing the geo-fencing area in the vehicle and recognizing whether the user or the driver enters and exits a specific area may be technically distinguished from a case where the vehicle might determine or recognize whether or not the user or the driver is getting on or off. For example, in order for determining whether the user or the driver is getting on or off, the vehicle uses a seat sensor and/or a door sensor to monitor whether the user or the driver would stay inside or outside the vehicle. However, in order for setting or storing the geo-fencing area in the vehicle and recognizing whether the user or the driver enters and exits the specific area, the vehicle monitors a wider area than those when the vehicle monitors whether the user or the driver may be inside or outside the vehicle. The user or the driver may stay in an area close to the vehicle although she or he has gotten off the vehicle (i.e., she or he is outside the vehicle), and in such a case, the user or the driver may want to be provided with a continuous service from the vehicle.

FIG. 1 shows a method for controlling an in-vehicle apparatus providing a geo-fencing service.

As shown, the method for controlling an in-vehicle apparatus providing the geo-fencing service can include providing a geo-fencing service based on location of a vehicle (step 22), detecting at least one of a mobile device and a wearable device which might be engaged with a communication terminal equipped in the vehicle (step 24) and requesting that a network server activates a notification for the geo-fencing service when the mobile device is determined to be located in a geo-fencing area and the wearable device is determined to be out of the geo-fencing area (step 30).

The control method of the in-vehicle apparatus can further include requesting that the network server deactivates the notification for the geo-fencing service when the mobile device and the wearable device are determined to be located within the geo-fencing area (step 28), and requesting that the network server activates the notification for the geo-fencing service when the mobile device is not detected (step 26).

Herein, the geo-fencing service may be performed or provided based on information received from the network server such as a telematics server coupled with the communication device equipped in the vehicle. A user or a driver can set contents, conditions, and the like related to the geo-fencing service at the network server. When electric devices mounted on the vehicle are activated (or turned on), an in-vehicle apparatus can receive related information from the network server and provide the geo-fencing service to the user or the driver. For the way of example but not limitation, as the geo-fencing service, the vehicle may track location of a driver or a user so as to provide information about intrusion or theft prevention for a vehicle security, or provide to the driver or the user location information about driver's or user's mobile devices, portable objects with the Internet of Things (IoT), or the like.

As, the step of requesting that the network server activates the notification for the geo-fencing service can include at least one step of requesting activation of the notification at the network server coupled with the communication terminal via a wireless communication network or requesting that the network server transmits a message to a predetermined mobile device pre-established at the network server. Herein, the predetermined mobile device comprises at least one portable device preset by a user possessing the mobile device.

Receiving location information or a request from the vehicle, the network server could prepare or control the geo-fencing service based on the location information or the request (step 32). For the way of example but limitation, when a user or a driver who has set up a geo-fencing service gets into a vehicle without carrying her or his mobile device, the vehicle can inform the network server that user's or driver's mobile device could not be discovered or detected. In this case, the network server can transmit into user's or driver's mobile device a message citing that the geo-fencing service via the vehicle may not be provided.

In addition, if a user or a driver who sets up the geo-fencing service is located far away from a vehicle and left his or her mobile device in the vehicle, the vehicle can inform the network server that the user or the driver would be out of a geo-fencing area. In this case, the network server could deliver a current status (e.g., a message citing that the user or the driver has placed his or her mobile device in the vehicle) into another communication means (e.g., a second mobile or portable device) previously designated by the user or the driver.

In order to provide above-mentioned geo-fencing services, the vehicle recognizes accurate location or position of a user or a driver and user's or driver's mobile or portable device.

Figure 2:
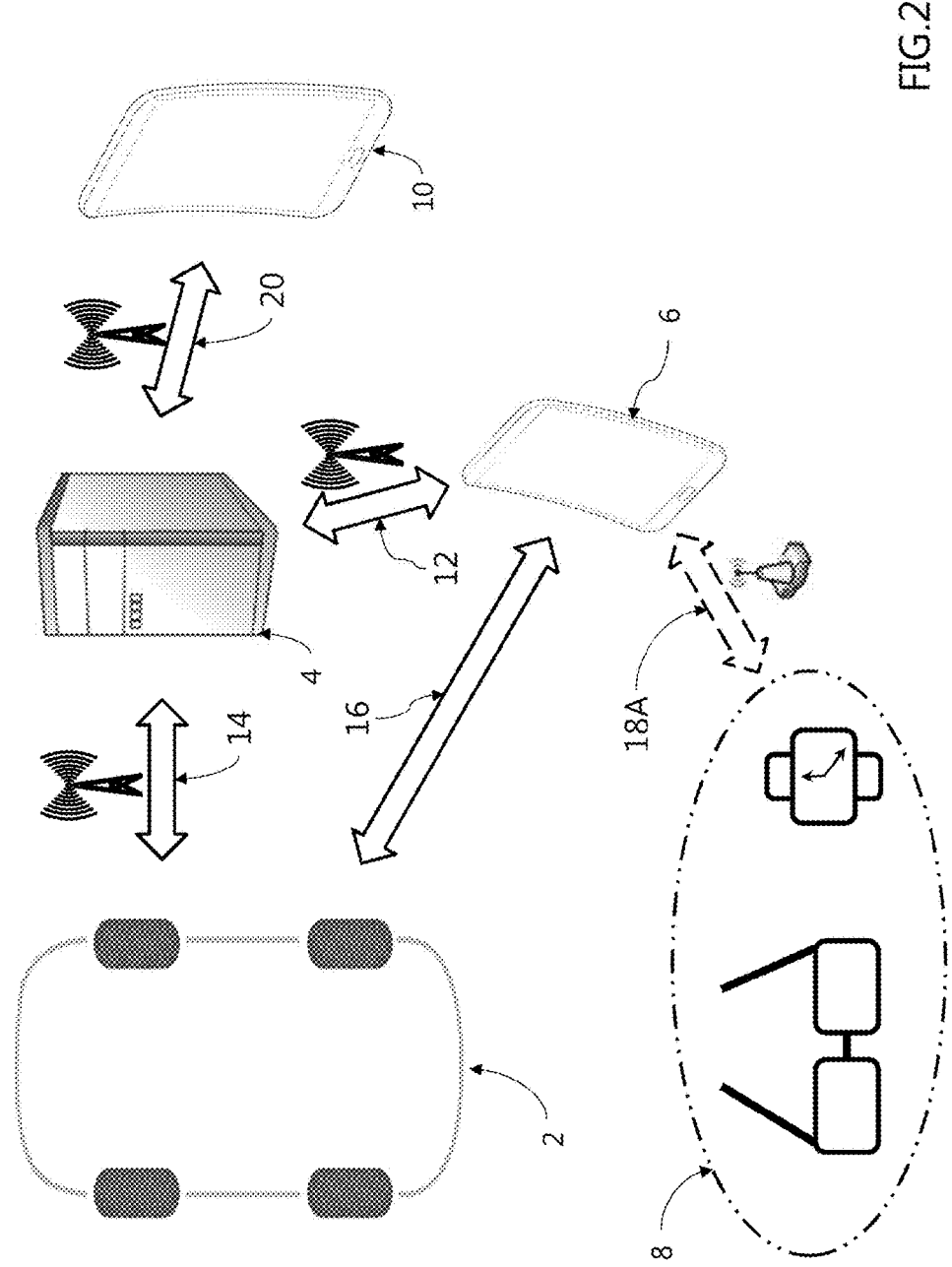
FIG. 2 describes a first operation of the in-vehicle apparatus providing the geo-fencing service.

FIG. 2 describes a first operation of the in-vehicle apparatus providing the geo-fencing service.

As shown, a vehicle 2 can be coupled with a telematics server 4 via a wireless communication network 14, and engaged with a mobile device 6 of a user or a driver via at least one of a short-range wireless communication technology or a wired communication technology 16. Further, the telematics server 4 could be coupled with the mobile device 6 of the user or the driver and another second mobile or portable device 10 designated by the user or the driver through wireless communication networks 12, 20. Herein, the second mobile or portable device 10 may be a single or a plurality of mobile or portable devices. Typically, the second mobile or portable device 100 could be owned by a family member, an acquaintance, an interested person, or the like who may be available when the user or the driver contacts in an emergency.

User's or driver's mobile device 6 coupled with the vehicle 2 could be engaged with a wearable device 8 worn by the user or the driver through a short-range wireless communication technology. Herein, the wearable device 8 may be implemented or realized in the form of a watch, glasses, a ring, a necklace, or the like. When the user or the driver wears the wearable device 8, it is likely that the wearable device 8 and the mobile device of the user or the driver are engaged with each other regardless of the geo-fencing service provided by the vehicle 2. This might be assumed because the user or the driver may intend to make the best use of the wearable device 8 and the mobile device 6 through interlocking the wearable device 8 with the mobile terminal 6. When the user or the driver engages the wearable device 8 with the mobile device 6, the vehicle can be engaged with the wearable device 8 and the mobile device respectively. Further, the vehicle 2 could recognize the wearable device 8 through the mobile device 6 engaged only, i.e., even if the vehicle is directly connected to the wearable device 8. When the vehicle is engaged with the mobile device 6 only, operation burden on the geo-fencing service might be reduced rather than the case where the vehicle would be required to be engaged with both the mobile device 6 and the wearable device 8.

The connection between the vehicle 2 and the mobile device 6 or the wearable device 8 can be achieved under the short-range wireless communication technology. Herein, as the short-range wireless communication technology, at least one of Bluetooth, Bluetooth Low Energy, Zigbee, Ultra Wide Band (UWB), and millimeter wave (mmWave) could be applicable. The vehicle 2 can more accurately recognize locations or positions of the mobile device 6 and the wearable device 8 through the short-range wireless communication technology.

On the other hand, the vehicle 2 could be connected with the mobile device 6 by a wired communication technology using a USB cable or the like.

Figure 3:
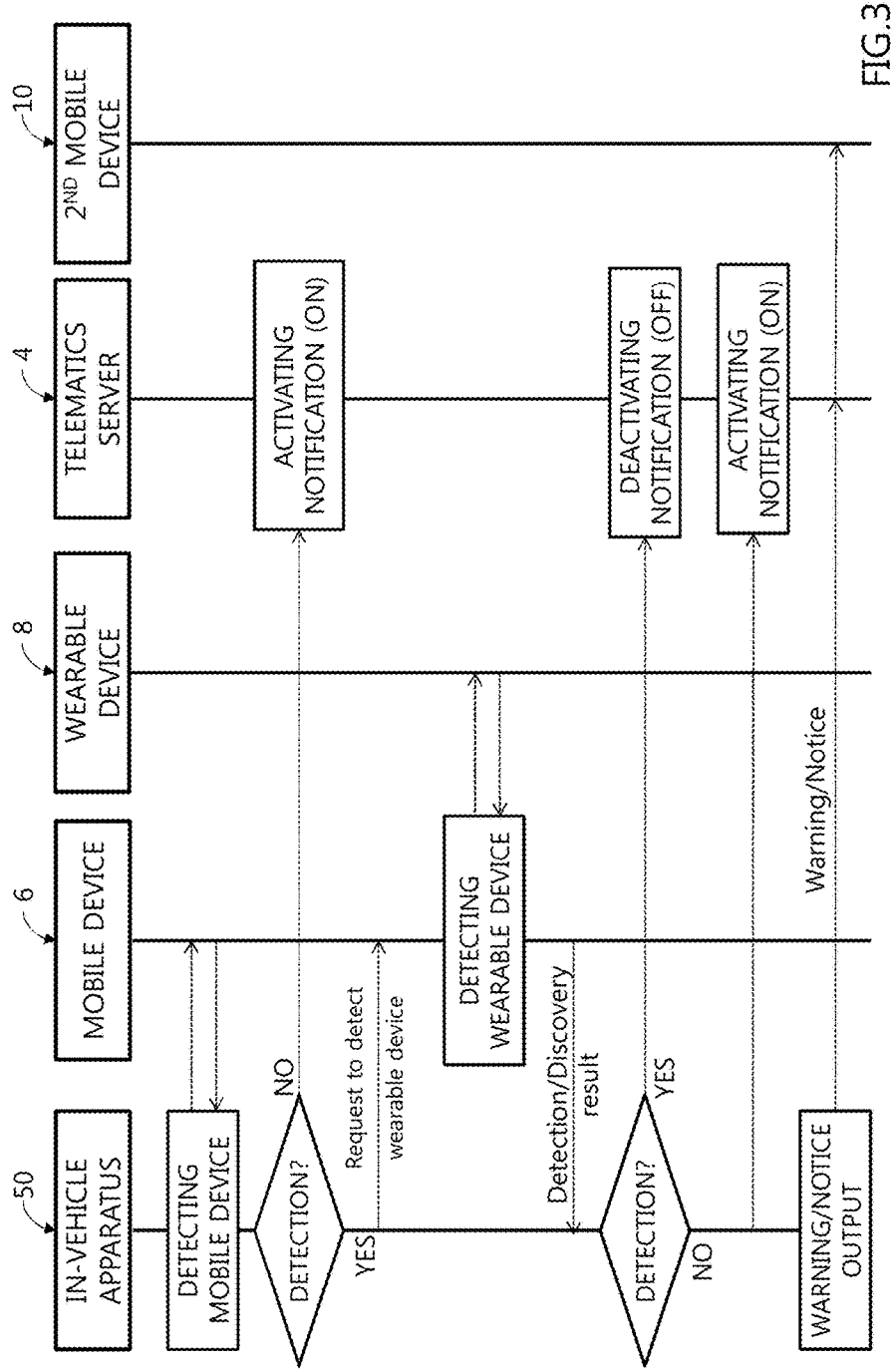
FIG. 3 shows a flowchart about the first operation shown in FIG. 2.

FIG. 3 shows a flowchart about the first operation shown in FIG. 2.

As shown, the in-vehicle apparatus 50 equipped in the vehicle 2 (as shown in FIG. 2) can discover or detect the mobile device 6. When the in-vehicle apparatus 50 does not discover or detect the mobile device 6, the in-vehicle apparatus 50 can transmit a discovery result to the telematics server 4. The telematics server 4 can activate a notification for the geo-fencing service based on the discovery result.

When the in-vehicle apparatus 50 could discover or detect the mobile device 6, location or position of the wearable device 8 could be checked or monitored through the mobile device 6. To this end, the in-vehicle apparatus 50 can request the mobile device 6 to detect or monitor the wearable device 8. The mobile device 6 can determine or monitor the presence (location or position) of the wearable device 8, and transmit a result to the in-vehicle apparatus 50. Herein, the presence (location or position) of the wearable device 8 can be regarded as the presence (location or position) of a driver or a user.

When the wearable device 8 is discovered or detected, the in-vehicle apparatus 50 can determine whether the driver or the user is located in a geo-fencing area as well as whether driver's or user's mobile device 6 is located within the geo-fencing area. In this case, the in-vehicle apparatus 50 may request the telematics server 4 to deactivate the notification for the geo-fencing service.

When the wearable device 8 is not discovered or detected, the in-vehicle apparatus 50 may determine that the driver or the user is out of the geo-fencing area but driver's or user's mobile device 6 is located within the geo-fencing area. In this case, the in-vehicle apparatus 50 may request the telematics server 4 to activate the notification for the geo-fencing service. In addition, the in-vehicle apparatus 50 can output a warning/notice via an audio-video-navigation (AVN) device mounted on the vehicle, and can request the telematics server 4 to deliver the warning/notice to another mobile or portable device. In response to a request from the in-vehicle apparatus 50, the telematics server 4 can transmit the warning/notice to at least one second mobile or portable terminal 10 designated by the user or the driver in advance at the telematics server 4.

Figure 4:
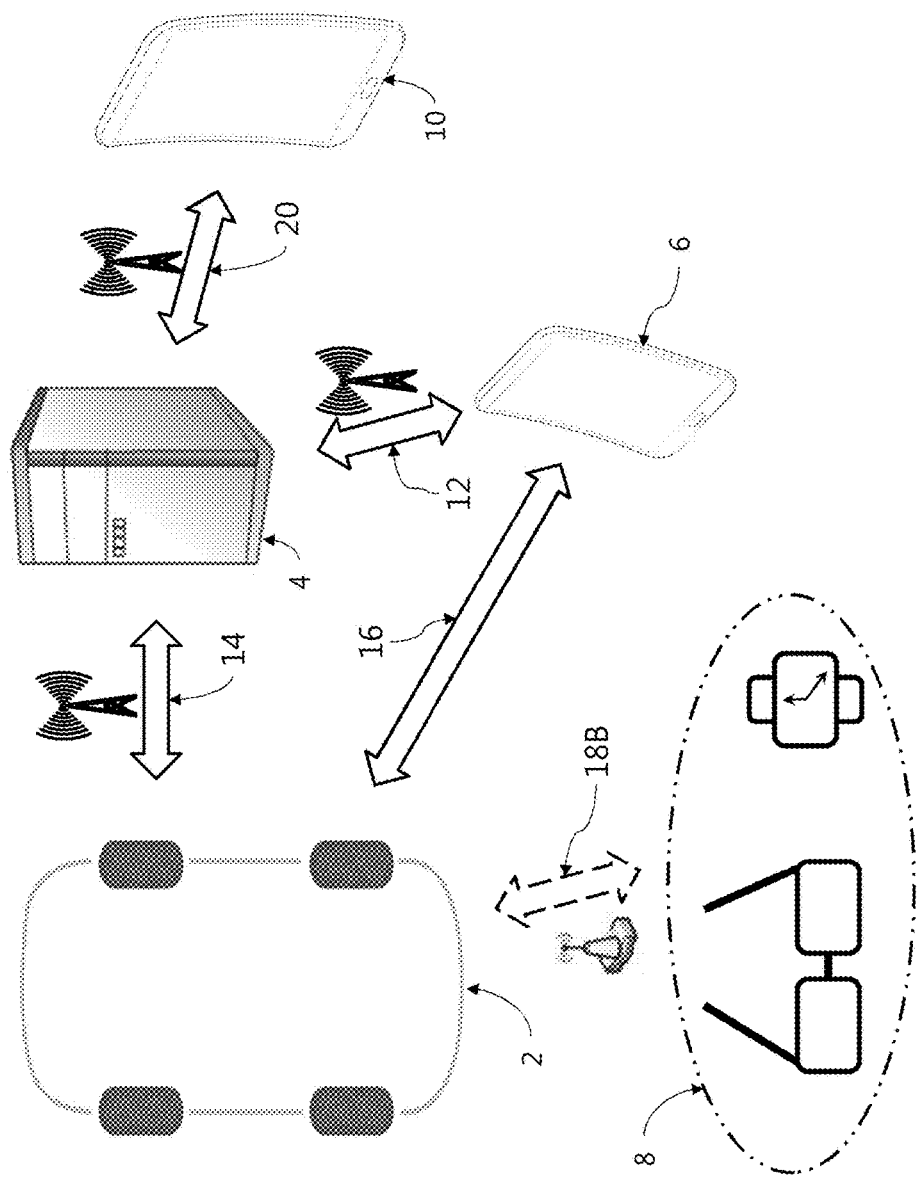
FIG. 4 describes a second operation of the in-vehicle apparatus providing the geo-fencing service.

FIG. 4 describes a second operation of the in-vehicle apparatus providing the geo-fencing service.

As shown, the vehicle 2 can be coupled with the telematics server 4 via the wireless communication network 14. The mobile device 6 of the user or the driver can communicate with the vehicle 2 via the short-range wireless communication technology. The telematics server 4 can also be engaged with the mobile device 6 of the user or the driver as well as another second mobile or portable terminal 10 designated by the user or the driver through the wireless communication networks 12, 20. Herein, the second mobile or portable terminal 10 may be a single device or a plurality of portable devices. Typically, a portable device might be owned by a family member, an acquaintance, an official, or the like who has a relationship with the user or the driver to contact in an emergency.

The vehicle 2 can be coupled with the wearable device 8 worn by the user or the driver as well as the mobile device 6 of the user or the driver through a short-range wireless communication technology. Herein, the wearable device 8 may be realized in the form of a watch, glasses, a ring, a necklace, or the like. When the vehicle 2 is engaged with the wearable device 8 as well as the mobile device 6, the vehicle 2 could recognize the location or position of the user or the driver without using the mobile device 6. According to embodiments, when the vehicle 2 is engaged with the wearable device 8 and the mobile device 6 respectively, the vehicle 2 may provide a geo-fencing service using the wearable device 8 instead of the mobile device 6.

The vehicle 2 is coupled with the mobile device 6 and the wearable device 8 under the short-range wireless communication technology. Herein, the short-range wireless communication method includes at least one of Bluetooth, Bluetooth Low Energy, Zigbee, Ultra Wide Band (UWB), millimeter wave (mmWave) and so on. The vehicle 2, the mobile device 6, and the wearable device 8 may be engaged with each other in the same manner through a short-range wireless communication technology supporting a plurality of wireless connections between multiple devices, or may be connected in different ways. The vehicle 2 can use the short-range wireless communication technology (e.g., strength of a wireless signal) in order to more accurately recognize the locations or positions of the mobile device 6 and the wearable device 8.

On the other hand, the vehicle 2 and the mobile device 6 can be connected by a wired communication technology using a USB cable or the like. When the vehicle 2 and the mobile device 6 are connected by a wired communication technology, the vehicle 2 can determine that the mobile device 6 is located within the geo-fencing area because a wire length (e.g., a communication cable) for using the wire communication technology would be limited.

Figure 5:
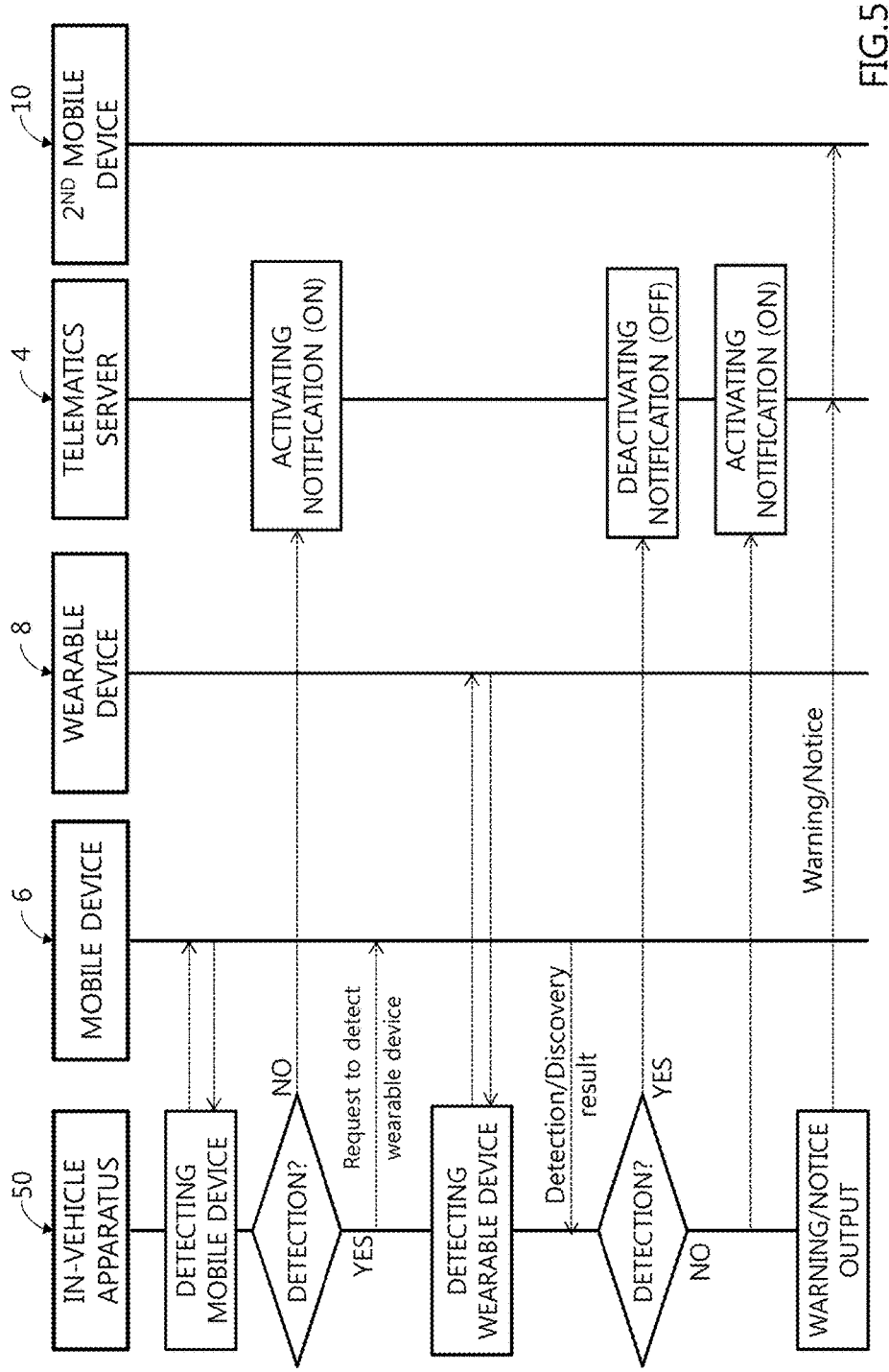
FIG. 5 shows a flowchart about the second operation shown in FIG. 4.

FIG. 5 shows a flowchart about the second operation shown in FIG. 4.

As shown, the in-vehicle apparatus 50 mounted on the vehicle 2 (referring to FIG. 4) can discover or detect the mobile device 6. When the in-vehicle apparatus 50 does not discover or detect the mobile device 6, the in-vehicle apparatus can transmit a corresponding result into the telematics server 4. In response to the corresponding result, the telematics server 4 can activate a notification for the geo-fencing service.

When the in-vehicle apparatus 50 may discover or detect the mobile device 6, the vehicle 2 can try to discover or detect the wearable device 8. Herein, the presence (location or position) of the wearable device 8 could be considered the presence (location or position) of a driver or a user.

When the wearable device 8 is also discovered or detected, the in-vehicle apparatus 50 can determine that the driver or the user is located in a geo-fencing area, and that driver's or user's mobile device 6 is located within the geo-fencing area. In this case, the in-vehicle apparatus 50 may send a request (such as in a form of message or signal) to the telematics server 4 in order that the telematics server 4 deactivates the notification for the geo-fencing service.

When the wearable device 8 is not detected, the in-vehicle apparatus 50 may determine that the driver or the user is out of the geo-fencing area while driver's or user's mobile device 6 is located within the geo-fencing area. In this case, the in-vehicle apparatus 50 may send a request to the telematics server 4 in order that the telematics server 4 activates the notification for the geo-fencing service. In addition, the in-vehicle apparatus 50 can output a warning/notice via an audio-video-navigation device mounted on the vehicle, and can request the telematics server 4 to transmit a warning/notice to another predetermined mobile or portable terminal. In response to the request, the telematics server 4 can transmit a message or signal including the corresponding contents such as the warning/notice into at least one second mobile or portable terminal 10, which the user or the driver has previously designated in advance. Herein, the message or signal could be determined based on delivered information regarding locations or positions of the user or the driver and user's and driver's mobile device (or wearable device).

Figure 6:
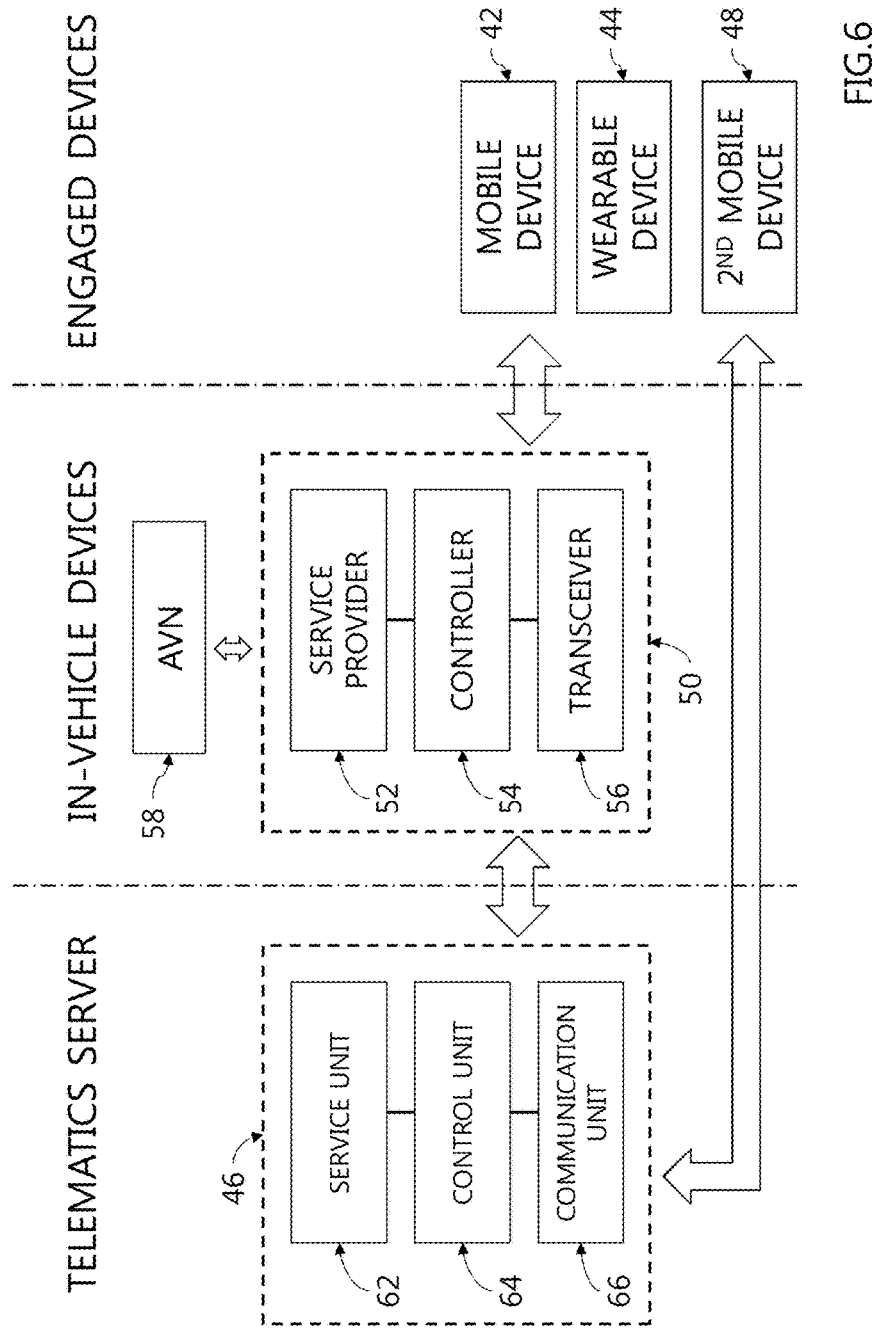
FIG. 6 shows an in-vehicle control apparatus providing a geo-fencing service.

FIG. 6 shows an in-vehicle control apparatus providing a geo-fencing service.

As shown, a telematics server 46, which provides a geo-fencing service based on location of a vehicle, can be coupled or engaged with an in-vehicle control apparatus 50 through a wireless communication network. The telematics server 46 can be also coupled with at least one of driver's or user's mobile device 42 and wearable device 44 as well as a second mobile or portable terminal 48 previously designated by the driver or the user, via a wireless communication technology. Herein, the telematics server 46 and the in-vehicle control apparatus 50 could include at least one of a computing device or a processing system that comprises at least one data processor and at least one computer-readable memory storing a computer program so as to control or provide the geo-fencing service.

The in-vehicle control apparatus 50 for controlling the geo-fencing service could be engaged with an audio-video-navigation device 58 mounted on the vehicle. Further, the in-vehicle control apparatus 50 might be coupled with at least one of the driver's or user's mobile device 42 and the driver's or user's wearable device 44, which is not equipped in or mounted on the vehicle, through at least one of a wireless communication network, a local area wireless communication network, a wired communication technology, a short-range wireless communication technology, or the like.

The telematics server 46 could be a network server that provides the geo-fencing service. The telematics server 46 can include a service unit 62 configured to provide the geo-fencing service based upon location of the vehicle, a communication unit 66 configured to receive information about location or position of at least one of the driver's or user's mobile device 42 and the driver's or user's wearable device 44, and a control unit 64 configured to activate a notification for the geo-fencing service when the driver's or user's mobile device 42 is determined to be located in a geo-fencing area while it is determined that the driver's or user's wearable device 44 is out of the geo-fencing area.

The control unit 64 that can control the provision of the geo-fencing service based on information delivered through the communication unit 66 could determine that the notification for the geo-fencing service is deactivated when both the driver's or user's mobile device 42 and the driver's or user's wearable device 44 are located in the geo-fencing area. Further, the control unit 64 may determine that the notification for the geo-fencing service is activated when the driver's or user's mobile device 42 is not discovered or detected.

On the other hand, the telematics server 46 can store information about the second mobile or portable terminal 48 that the user or the driver has previously designated. When the driver's or user's mobile device 42 is located in the geo-fencing area but the driver's or user's wearable device 44 is not located in the corresponding geo-fencing area, the control unit 64 can determine transmission of a message or signal to be delivered into the second mobile or portable terminal 48. Herein, the second mobile or portable terminal 48 may include at least one portable terminal designated by the user or the driver possessing or using the driver's or user's mobile device 42. In addition, the message or signal delivered into the second mobile or portable terminal 48 may include information about position or location of the driver's or user's mobile device 42.

The in-vehicle control apparatus 50 can be provided with a service provider 52 configured to provide the geo-fencing service through an audio-video-navigation device 58 mounted on a vehicle, a transceiver 56 configured to discover or detect at least one of the driver's or user's mobile device 42 and the driver's or user's wearable device 44, and a controller 54 configured to send to the telematics server 46 a request (message or signal) that the telematics server 46 activates the notification for the geo-fencing service when the driver's or user's mobile device 42 is located in the geo-fencing area while the driver's or user's wearable device 44 is out of the geo-fencing area. Herein, the geo-fencing service may be performed or provided based on information received from the telematics server 46 via the wireless communication network.

For the way of example but not limitation, the transceiver 56 can discover or detect the driver's or user's mobile device 42 connected through at least one of the short-range wireless communication technology and the wired communication technology, and receive from the driver's or user's mobile device 42 information about the driver's or user's wearable device 44 coupled with the driver's or user's mobile device 42 via the short-range wireless communication technology.

According to an embodiment, the transceiver 56 can directly discover or detect the driver's or user's mobile device through at least one of the short-range wireless communication technology and the wired communication technology as well as the driver's or user's wearable apparatus 44 via the short-range wireless communication technology. For the way of example but not limitation, a USB cable or the like could be applicable as the wired communication technology. Further, the short-range wireless communication technology may include at least one of Bluetooth, Bluetooth Low Energy, Zigbee, Ultra Wide Band (UWB), millimeter wave (mmWave) and the like.

The controller 54 may request the telematics server 46 to deactivate the notification for the geo-fencing service when it is determined that both the driver's or user's mobile device and the driver's or user's wearable device 44 are located within the geo-fencing area. Further, when not discovering or detecting the driver's or user's mobile device 42, the controller 54 may request the telematics server 46 to activate the notification for the geo-fencing service.

When the controller 54 requests the telematics server 46, coupled with the transceiver 56 via the wireless communication network, to activate the notification for the geo-fencing service, the telematics server 46 can deliver a message or a signal sent through the communication unit 66 into the second mobile or portable terminal 48 previously designated by the user or the driver. Herein, the second mobile or portable terminal 48 may include at least one portable terminal previously set by a user or a driver having/using the driver's or user's mobile device 42. In addition, the message or the signal may include information about position or location of the driver's or user's mobile device 42.

In embodiments, in a case when a user or a driver who sets up a geo-fencing service left a mobile device in a vehicle and took off the vehicle, the user or the driver could not be informed of a notification for the geo-fencing service and the vehicle could be out of a geo-fence (i.e., a specific area designated by the user or the driver). At the time, the apparatus above described can inform the user or the driver that her or his mobile device is left in the vehicle, or inform the user or the driver that the vehicle is out of the geo-fence or in an unexpected condition, so that the user or driver can cope with those situations.

In addition, the disclosure can provide an in-vehicle control device, which can accurately determine and notify of a current state of a vehicle, to a user or a driver who has set up a geo-fencing service by utilizing a wearable device.

The aforementioned embodiments are achieved by invention in a predetermined manner. Each of the structural combination of structural elements and features of the elements or features can be considered selectively unless specified separately. Each of the structural elements or features may be carried out without being combined with other structural elements or features. Also, some structural elements and/or features may be combined with one another to constitute certain embodiments of the invention. The order of operations described in certain embodiments of the invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute certain embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

It will be apparent to those skilled in the art that various modifications and variations can be made in the present invention without departing from the spirit or scope of the inventions. Thus, it is intended that the invention covers the modifications and variations of this invention provided they come within the scope of the appended claims and their equivalents.

What is claimed is:

1. A method for controlling an in-vehicle apparatus, the method comprising:
    providing a geo-fencing service based on location of a vehicle;
    detecting at least one of a mobile device and a wearable device based on communication with a communication terminal equipped in the vehicle;
    determining location of the at least one of the mobile device and the wearable device based on the communication with the communication terminal; and
    transmitting a request for a network server to activate a notification to a predetermined user device when the mobile device is determined to be located in a geo-fencing service area and the wearable device is determined to be out of the geo-fencing service area.

2. The method according to claim 1, wherein detecting the mobile device and the wearable device comprises:
   detecting the mobile device coupled with the communication terminal through at least one of a short-range wireless communication technology and a wired communication technology; and
   receiving, from the mobile device, information of the wearable device that is in communication with the mobile device through the short-range wireless communication technology.

3. The method according to claim 1, wherein detecting the mobile device and the wearable device comprises:
   detecting the mobile device coupled with the communication terminal through at least one of a short-range wireless communication technology and a wired communication technology; and
   detecting the wearable device coupled with the communication terminal through the short-range wireless communication technology.

4. The method according to claim 1, wherein the geo-fencing service is performed based on information received from the network server by the communication terminal, and wherein the communication terminal is in communication with at least one of the mobile device and the wearable device through a short-range wireless communication technology including at least one of Bluetooth, Bluetooth Low Energy, Zigbee, Ultra Wide Band (UWB), and millimeter wave (mmWave).

5. The method according to claim 1, further comprising:
   requesting that the network server deactivate the notification to the predetermined user device when the mobile device and the wearable device are determined to be located within the geo-fencing service area.

6. The method according to claim 1, further comprising:
   requesting that the network server activate the notification to the predetermined user device when the mobile device is not detected.

7. The method according to claim 1, further comprising requesting the activation of the notification at a network server coupled with the communication terminal via a wireless communication network.

8. The method according to claim 7, wherein the predetermined user device comprises at least one portable device predesignated by a user possessing the mobile device.

9. An in-vehicle apparatus for controlling a geo-fencing service, comprising:
   a service delivery unit configured to deliver the geo-fencing service to be provided based on location of a vehicle;
   a communication unit configured to detect at least one of a mobile device and a wearable device and to determine location of the at least one of the mobile device and the wearable device; and to
   a controller configured to request a network server to transmit a notification to a predetermined user device when the mobile device is determined to be located in a geo-fencing service area and the wearable device is determined to be out of the geo-fencing service area.

10. The in-vehicle apparatus according to claim 9, wherein the geo-fencing service is performed based on information received from the network server by the communication unit.

11. The in-vehicle apparatus according to claim 9, wherein the communication unit is capable of detecting the mobile device coupled through at least one of a short-range wireless communication technology and a wired communication technology, and wherein the communication unit is further capable of receiving, from the mobile device, information of the wearable device that is in communication with the mobile device via the short-range wireless communication technology.

12. The in-vehicle apparatus according to claim 9, wherein the communication unit is capable of detecting the mobile device coupled through at least one of a wireless communication technology and a wired communication technology and receiving information of the wearable device coupled via a short-range wireless communication technology.

13. The in-vehicle apparatus according to claim 9, wherein the controller is configured to request the network server to deactivate the notification when the mobile device and the wearable device are determined to be located within the geo-fencing service area.

14. The in-vehicle apparatus according to claim 9, wherein the controller is configured to request the network server to activate the notification when the mobile device is not detected.

15. The in-vehicle apparatus according to claim 9, wherein the controller is configured to request activation of the notification at the network server coupled with the communication terminal via a wireless communication network.

16. A network server in communication with a vehicle to provide a geo-fencing service, comprising:
   a service unit configured to recognize location of a vehicle and to provide the geo-fencing service based on the location of the vehicle;
   a communication unit configured to receive location of at least one of a mobile device and a wearable device from the vehicle; and
   a control unit configured to activate a notification to a predetermined user device when the mobile device is determined to be located in the geo-fencing service area and the wearable device is determined to be out of the geo-fencing service area.

17. The network server according to claim 16, wherein the control unit is configured to deactivate the notification when the mobile device and the wearable device are determined to be located within the geo-fencing service area.

18. The network server according to claim 16, wherein the control unit is configured to activate the notification when the mobile device is not detected.

19. The network server according to claim 16, wherein the control unit is configured to transmit a message to the predetermined user device, and wherein the message comprises the location of the mobile device.

20. The network server according to claim 19, wherein the predetermined user device comprises at least one portable device predesignated by a user possessing the mobile device.

* * * * *